(12) United States Patent
Fischer

(10) Patent No.: US 8,351,302 B2
(45) Date of Patent: Jan. 8, 2013

(54) POWER SUPPLY FOR CLOCK

(76) Inventor: Jeremy Laurence Fischer, Wrightstown, PA (US)

( * ) Notice: Subject to any disclaimer, the term of this patent is extended or adjusted under 35 U.S.C. 154(b) by 171 days.

(21) Appl. No.: 13/023,913

(22) Filed: Feb. 9, 2011

(65) Prior Publication Data

US 2012/0201102 A1    Aug. 9, 2012

(51) Int. Cl.
G04B 3/00 (2006.01)
(52) U.S. Cl. .......... 368/64; 368/204
(58) Field of Classification Search .......... 368/203–204, 368/64; 320/107
See application file for complete search history.

(56) References Cited

U.S. PATENT DOCUMENTS

| | | |
|---|---|---|
| 3,201,742 A | 8/1965 | English |
| 4,464,445 A | 8/1984 | Matti |
| 4,946,396 A | 8/1990 | Saitoh |
| 4,988,584 A | 1/1991 | Shaper |
| 5,076,805 A | 12/1991 | Welch |
| 5,296,315 A | 3/1994 | Rein |
| 5,339,296 A * | 8/1994 | Davis ............... 368/67 |
| 5,354,215 A | 10/1994 | Viracola |
| 6,007,373 A | 12/1999 | Chew |
| 6,495,932 B1 * | 12/2002 | Yoshimizu et al. ........... 307/150 |
| 6,906,496 B1 * | 6/2005 | Grace ............ 320/110 |
| 7,354,301 B2 | 4/2008 | Noguchi |
| 7,494,368 B2 | 2/2009 | Noguchi |
| 7,794,272 B1 * | 9/2010 | Hiatt et al. .............. 439/500 |
| 2005/0041447 A1 | 2/2005 | Khosia |
| 2008/0280484 A1 | 11/2008 | Taylor |

FOREIGN PATENT DOCUMENTS

| | | |
|---|---|---|
| GB | 2225178 A | 5/1990 |
| GB | 2230150 A | 10/1990 |

* cited by examiner

Primary Examiner — Sean Kayes
(74) Attorney, Agent, or Firm — Howson & Howson LLP

(57) ABSTRACT

A line current power supply delivers operating current to a clock designed to be powered by a conventional electrochemical cell disposed in a power source compartment within the clock housing, and at the same time supplies recharging current to a rechargeable electrochemical cell for powering the clock in the absence of an external power supply. The rechargeable cell is contained within a cylindrical enclosure having a shape such that it can fit into the power source compartment of the clock, and having contacts allowing it to be substituted for the conventional electrochemical power source.

1 Claim, 3 Drawing Sheets

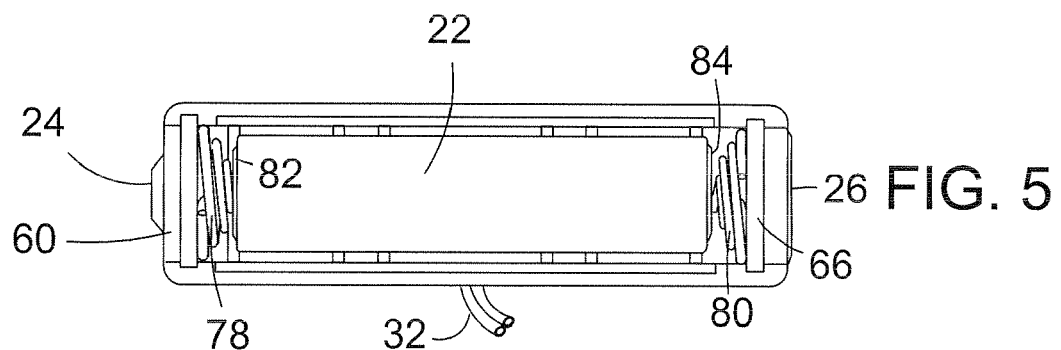
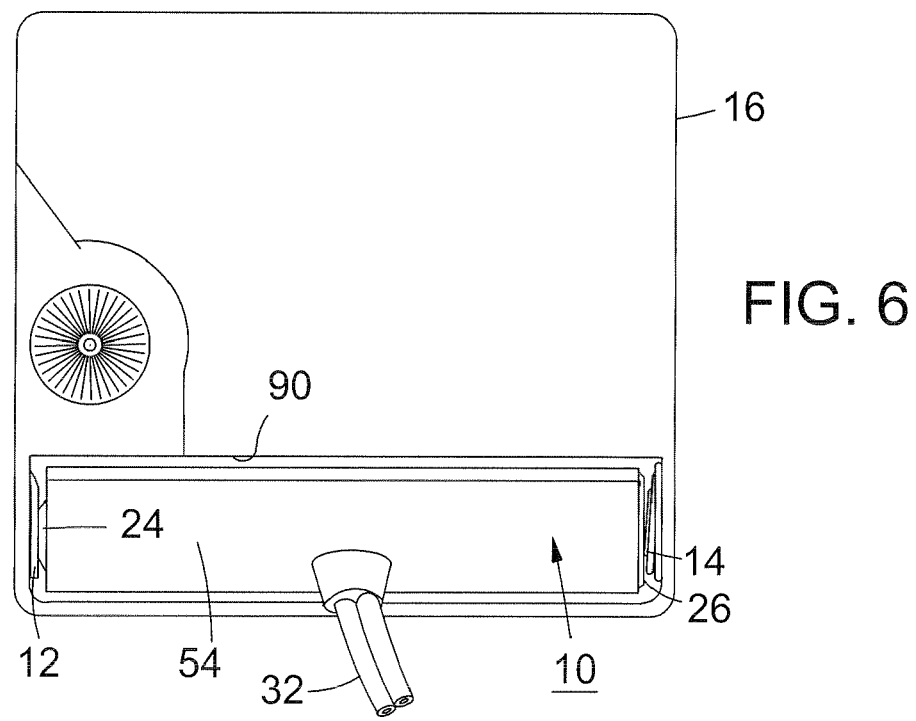

POWER SUPPLY FOR CLOCK

FIELD OF THE INVENTION

This invention relates to electric power supplies, and more particularly to a power supply that enables a clock that is normally battery-operated to be operated optionally on line current and to revert automatically to battery operation when line current fails or is intentionally removed.

BACKGROUND OF THE INVENTION

Many conventional digital and analog clocks utilize an electrochemical cell (commonly referred to as a "battery") as a power source. A typical cell, such as an "AA" cell, delivers direct current at a potential of 1.5 volts. In such a clock, the electrochemical cell is the only power source. Modification of an existing conventional battery-operated clock for operation from a 120 volt AC line requires extensive modification and is impractical. Such a modification can also prevent later use of the clock as a battery-operated device, eliminating its portability, and preventing the clock from being used except when in proximity to a source of line current. Moreover, when the converted clock is operable only on line current, it will stop operating in the event of a power failure, and needs to be reset when power is restored.

SUMMARY OF THE INVENTION

This invention is a substitute electric power supply for providing current to a clock normally powered by an electrochemical cell. The substitute power supply comprises a hollow shell having a cylindrical wall with first and second opposite ends, a first conductive contact exposed at the first end and a second conductive contact exposed at the second end. The contacts are connected to an external power adapter for connection to an electrical outlet, and to a rechargeable electrochemical cell within the shell. When current is received from the outlet, current is delivered to the clock and to the rechargeable electrochemical cell. When current is not received from the external power supply, current is received by the clock from the rechargeable electrochemical cell.

The adapter, also sometimes referred to herein as a "transformer unit," may include a plug for connection to an alternating current outlet and a step-down transformer connected to the plug. A flexible two-conductor cable connected to the transformer unit delivers current at a reduced voltage to the hollow shell, and is connected to the contacts at the ends of the shell. A rectifier is connected to the cable for converting low voltage alternating current delivered by the step-down transformer to low voltage direct current, whereby a low DC voltage is supplied to the contacts, and to the rechargeable electrochemical cell within the shell. The rectifier can be located within the transformer unit, or alternatively within the hollow shell. The rechargeable cell is connected to the cable for receiving charging current from the cable and the rectifier, and is connected to the contacts for delivering electric current to the contacts for operation of the clock when the plug is not receiving alternating current from an outlet.

The invention can also be defined as a combination clock and electric power supply for delivering operating current to the clock. The combination comprises a clock unit comprising a clock having a time display and a driver connected to the time display. The driver is operable by low voltage direct current. The clock unit includes a receptacle for receiving a first cylindrical electrochemical cell having positive and negative terminals respectively at opposite ends thereof, and contacts within the receptacle for engaging the respective positive and negative terminals of the electrochemical cell.

The combination further comprises a substitute power supply for supplying direct current to the clock as an alternative to the first electrochemical cell, the power supply comprising a hollow shell having a size and shape enabling it to be received in the receptacle as a substitute for the first electrochemical cell. The shell has a cylindrical wall with first and second opposite ends, a first conductive contact exposed at the first end, and a second conductive contact exposed at the second end, the first and second exposed contacts being respectively engaged with the contacts within the receptacle. The substitute power supply also includes a transformer unit comprising a plug for connection to an alternating current outlet and a step-down transformer connected to the plug, a flexible two-conductor cable connected to the transformer for delivering current at a reduced voltage to the hollow shell, the cable being connected to the first and second contacts, and a rectifier connected to the cable for converting low voltage alternating current delivered by the step-down transformer to low voltage direct current.

A low DC voltage is supplied to the first and second contacts, and to a rechargeable second electrochemical cell within the shell, the rechargeable cell being smaller than the first electrochemical cell and connected to the cable for receiving charging current from the cable and the rectifier. The rechargeable cell is also connected to the first and second contacts and delivers electric current to the contacts within the receptacle for operation of the clock when the plug is not receiving alternating current from an outlet.

BRIEF DESCRIPTION OF THE DRAWINGS

FIG. 5 is a plan view of the shell half of FIGS. 2, 3 and 4, showing a rechargeable electrochemical cell in place within the interior of the shell and showing the spring contacts in a compressed condition between the contacts at the ends of the shell and the ends of the rechargeable cell;

FIG. 6 is a rear elevational view of a clock showing the cylindrical shell in place within the clock's power source compartment.

DETAILED DESCRIPTION OF THE INVENTION

In the invention, a substitute power supply provides current to a clock normally powered by an electrochemical cell. In the embodiment illustrated in FIGS. 1-7, an electrochemical cell, e.g., an "AA battery" (not shown), is replaced by a "dummy" unit 10 having a size and shape equivalent to that of the original electrochemical cell and having contacts that cooperate with the clock's power supply compartment contacts 12 and 14 in the same way in which the original cell's contacts cooperate with clock's power supply compartment contacts.

Figure 1:
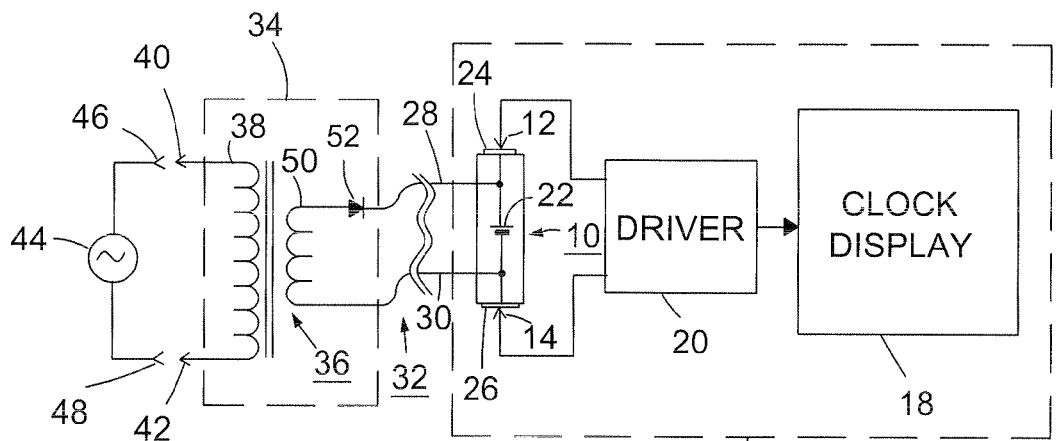
FIG. 1 is an electrical schematic diagram of an embodiment of the invention.

As shown in the electrical schematic of FIG. 1, the dummy unit 10 and contacts 12 and 14 are contained within an enclosure 16, which includes a clock display 18 and a driver 20. The clock can be an digital clock, in which case the display will comprise a suitable display device such as a liquid crystal (LCD) display or light emitting diode (LED) display, and the driver can include an electronic pulse generator, a counter, and translation circuitry for translating the count into a time display. Alternatively the clock display can be an analog clock movement operated by electronically generated pulses from the driver. In either case, the clock can be controlled optionally by radio time signals, or by time signals transmitted by a satellite or derived from the Internet, and delivered to the clock driver by means of a wired or wireless link.

As shown in FIG. 1, the dummy unit 10 includes a rechargeable cell 22, the positive terminal of which is connected to a contact 24 at one end of the cell and the negative terminal of which is connected to a contact 26 at the opposite end of the cell. These contacts 24 and 26 engage contacts 12 and 14 in the clock's power source compartment.

Contacts 24 and 26 are also respectively connected to conductors 28 and 30 of a flexible two-conductor cable 32, which leads from a transformer unit 34 to the dummy unit 10. The transformer unit includes a step-down transformer 36, the primary winding 38 of which is connected to plug prongs 40 and 42, which can connect to a conventional line current supply 44 through wall outlet terminals 46 and 48. One end of the secondary winding 50 of the transformer is connected directly to conductor 30, and the other end of the secondary winding is connected to conductor 28 through a diode 52, which serves as a rectifier supplying a pulsating dc to the cable 32. Although the rectifier in the embodiment shown utilizes a single diode, other rectification circuits can be utilized. For example, full-wave rectification can be accomplished using a bridge (4-diode) rectifier. Full-wave rectification may also be accomplished with a center-tapped transformer using two diodes. The transformer will ordinarily be designed to convert 120 volt ac supplied to the transformer primary to an ac voltage that, when rectified, is capable of operating the clock driver 20, and at the same time capable of charging cell 22 without damaging the same. Optionally, a capacitor (not shown) can be connected from conductor 28 to conductor 30 to smooth out pulsations in the dc delivered to cable 32. However, because the rechargeable cell 22 has a similar effect, the capacitor can be omitted.

The shell of the dummy unit is a cylindrical shell composed of a suitable plastics material, and comprises a pair of similar half-shells that can snap together, or that can be held together by means of an adhesive or by fusing the shell material at locations at which the shell halves come together. One such shell half is shell half 54 shown in FIG. 2. The shell halves have small and large semi-circular recesses 56 and 58 at one end, which receive correspondingly shaped parts of a circular metal contact 60. Similarly, at the opposite end, the shell halves have small and large semi-circular recesses 62 and 64, which receive correspondingly shaped parts of a circular metal contact 66. Contact 60 serves as a positive terminal, and contact 66 serves as a negative terminal.

Figure 2:
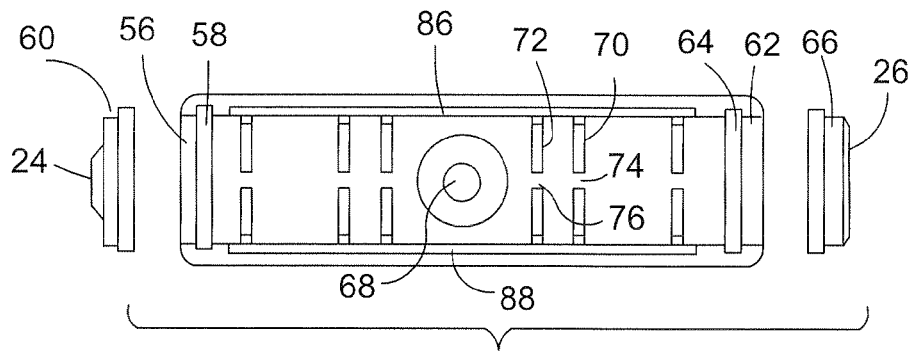
FIG. 2 is an exploded view showing one half of a cylindrical shell to be substituted for a conventional electrochemical power source in a clock, and also showing positive and negative contacts that fit into ends of the cylindrical shell.
Figure 3:
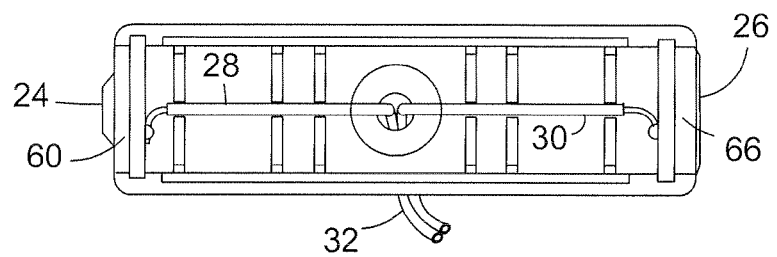
FIG. 3 is a plan view of the shell half of FIG. 2, showing the contacts in place and connected to a cable used to supply current from a transformer unit.
Figure 4:
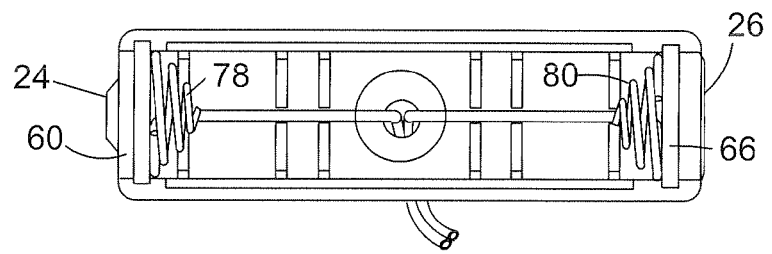
FIG. 4 is plan view of the shell half of FIGS. 2 and 3, showing internal spring contacts in place at both ends of the interior of the shell.

Shell half 54 is formed with an opening 68 midway between its ends for passage of two-conductor cable 32 (FIG. 1), and a set of internal ribs, e.g., ribs 70 and 72, which are for supporting a rechargeable cell within the shell and which have gaps, e.g. gaps 74 and 76 to provide a space for passage of split insulated conductors 28 and 30 of the cable 32 to the positive and negative terminals as shown in FIG. 3. The conductors of the cable are soldered, or otherwise suitably connected, to the contacts 60 and 66. The other half shell (not shown in FIGS. 2-5, can be substantially identical to the half-shell in FIG. 2, but does not need to have an opening corresponding to opening 68.

Tapered coil springs 78 and 80 are provided on the inner faces of contacts 60 and 66, respectively, and may be fastened to the contacts by soldering, welding or other suitable means that allow electrical contact between each spring and its adjacent contact.

As shown in FIG. 5, rechargeable electrochemical cell 22 is disposed inside the cylindrical shell. Its length is such that its positive terminal 82 makes contact with spring 78 and its negative terminal 84 makes contact with spring 80, and both springs are held in compression to ensure electrical conduction from terminal 82 to contact 60 and from terminal 84 to contact 66.

With the rechargeable cell 22 in place, the other shell half can be snapped into place forming an complete cylindrical cell having the size and shape of a conventional "AA" cell, with positive and negative terminals at its respective ends. As shown in FIG. 2, shell half 54 is formed with a longitudinal rib 86 at one side and a longitudinal groove 88 at its opposite side. The other shell half is formed with a similar rib and groove (not shown) which fit groove 88 and rib 86 respectively allowing the shell halves to fit together in aligned relationship.

As shown in FIG. 6, the dummy unit 10 fits into a power source compartment 90 of clock 16, with its positive terminal 24 in contact with a fixed clock contact 12, and with its negative terminal 26 in contact with clock contact 14, the latter contact being a resilient metal spring arranged to press against terminal 14, thereby holding the dummy unit in place and maintaining electrical contact at both ends of the dummy unit.

Figure 7:
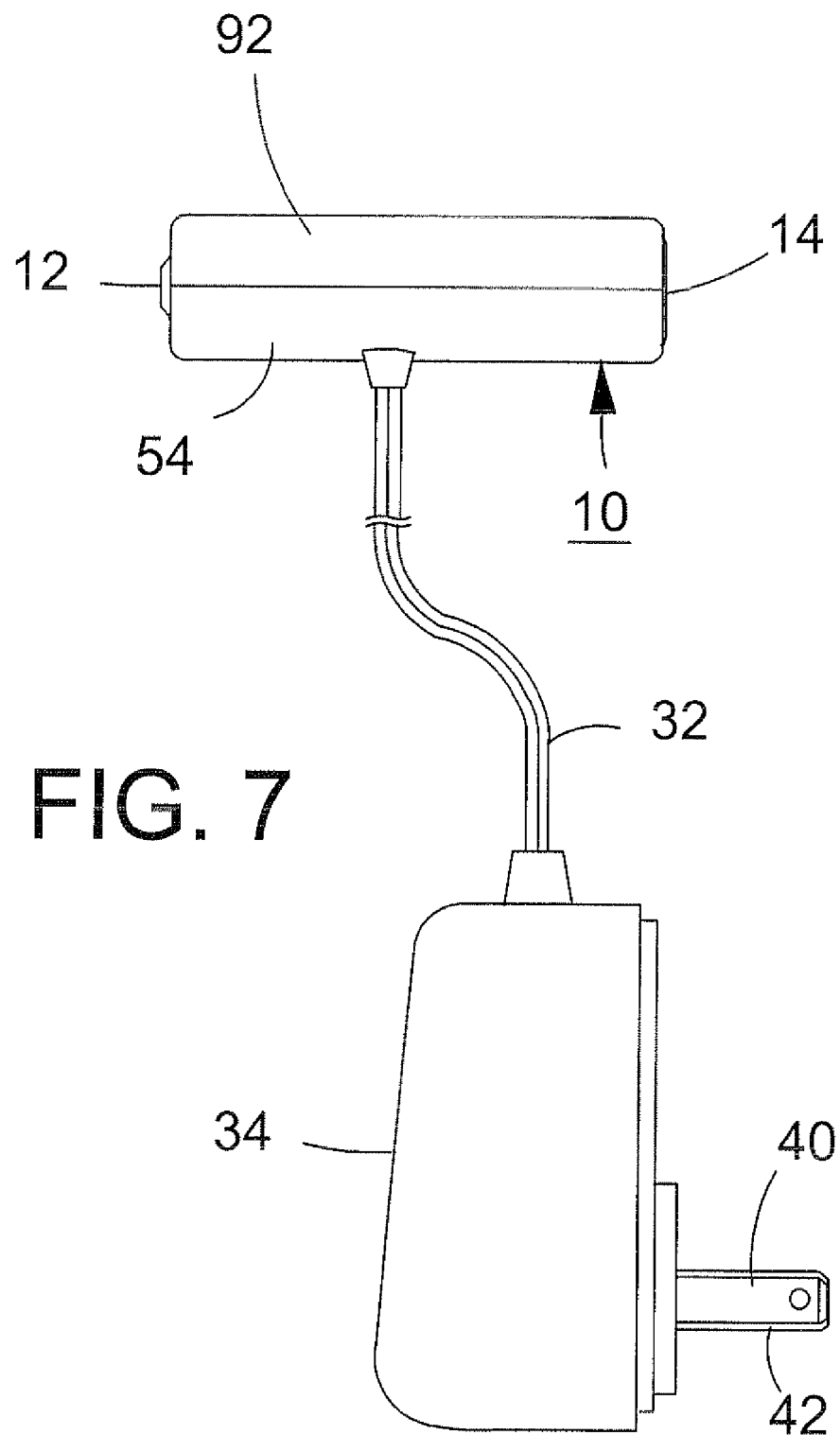
FIG. 7 is an elevational view of the shell, a transformer unit, and a flexible two-conductor cable connecting the shell to the transformer unit.

As shown in FIG. 7, the dummy unit 10 shell half 92 fits shell half 54 so that the two shell halves form a unit having the shape and size of a conventional electrochemical cell, e.g. an "AA" cell. The dummy unit is connected through a flexible, two-wire cable 32 to transformer unit 34, which supplies low voltage dc to the dummy unit when its plug prongs 40 and 42 are engaged with a wall outlet.

The invention allows a clock normally powered by a conventional AA cell or the like to be powered alternatively from line current without any modifications to the clock. It also has the advantages of avoiding periodic replacement of the electrochemical power source and of maintaining clock operation in the case of a power failure.

The rechargeable electrochemical cell to be inserted in the dummy unit can be any of a variety of rechargeable devices, such as a nickel metal hydride (NiMH) rechargeable cell, a nickel cadmium (NiCd) rechargeable cell or a lithium ion (Li-ion) rechargeable cell.

In certain embodiments, it may be desirable for the rechargeable cell to be charged slowly. In that case, by use suitable diodes and resistors, the clock can be normally operated solely by current from the transformer unit without any draw on the rechargeable cell, while at the same time, the cell's charging current can be limited. However, in the event the line current is cut off, either by unplugging the transformer unit or because of a power failure, the full current delivery capability of the rechargeable cell can be available to operate the clock.

Numerous other modifications can be made without departing from the spirit of the invention. Such modifications are intended to fall within the scope of the appended claims.

What is claimed is:

1. A combination clock and electric power supply for delivering operating current to the clock, the combination comprising:

a clock unit comprising a clock having a time display and a driver connected to said time display, the driver being operable by low voltage direct current, the clock unit including a receptacle for receiving a first cylindrical electrochemical cell having positive and negative terminals respectively at opposite ends thereof, and contacts within said receptacle for engaging the respective positive and negative terminals of the electrochemical cell; and a substitute power supply for supplying direct current to the clock as an alternative to said first electrochemical cell, the power supply comprising a hollow shell having a size and shape enabling it to be received in said receptacle as a substitute for said first electrochemical cell, the shell having a cylindrical wall with first and second opposite ends, a first conductive contact exposed at said first end, and a second conductive contact exposed at said second end, said first and second exposed contacts being respectively engaged with the contacts within said receptacle, the substitute power supply also including a transformer unit comprising a plug for connection to an alternating current outlet and a step-down transformer connected to said plug, a flexible two-conductor cable connected to said transformer for delivering current at a reduced voltage to said hollow shell, said cable being connected to said first and second contacts, and a rectifier connected to said cable for converting low voltage alternating current delivered by said step-down transformer to low voltage direct current, whereby a low DC voltage is supplied to said first and second contacts, and a rechargeable second electrochemical cell within said shell, the rechargeable cell being smaller than said first electrochemical cell and connected to said cable for receiving charging current from said cable and said rectifier, and being connected to said first and second contacts for delivering electric current to said contacts within the receptacle for operation of the clock when the plug is not receiving alternating current from an outlet.

* * * * *